United States Patent
Ash et al.

(10) Patent No.: US 10,841,395 B2
(45) Date of Patent: *Nov. 17, 2020

(54) POPULATING A SECONDARY CACHE WITH UNMODIFIED TRACKS IN A PRIMARY CACHE WHEN REDIRECTING HOST ACCESS FROM A PRIMARY SERVER TO A SECONDARY SERVER

(71) Applicant: INTERNATIONAL BUSINESS MACHINE CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US); Matthew J. Kalos, Tucson, AZ (US); Brian A. Rinaldi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/364,102

(22) Filed: Mar. 25, 2019

(65) Prior Publication Data
US 2019/0222669 A1 Jul. 18, 2019

Related U.S. Application Data

(63) Continuation of application No. 14/918,424, filed on Oct. 20, 2015, now Pat. No. 10,320,936.

(51) Int. Cl.
*H04L 29/08* (2006.01)
*G06F 3/06* (2006.01)
(Continued)

(52) U.S. Cl.
CPC ......... *H04L 67/2852* (2013.01); *G06F 3/065* (2013.01); *G06F 3/067* (2013.01);
(Continued)

(58) Field of Classification Search
CPC .................................................. H04L 67/2852
See application file for complete search history.

(56) References Cited

U.S. PATENT DOCUMENTS 7,035,979 B2    4/2006  Azevedo et al.
8,006,061 B1    8/2011  Chatterjee et al.
(Continued)

FOREIGN PATENT DOCUMENTS

CN        103744800        4/2014

OTHER PUBLICATIONS

English translation of CN103744800 dated Apr. 23, 2014.
(Continued)

*Primary Examiner* — Nicholas P Celani
(74) *Attorney, Agent, or Firm* — David W. Victor; Konrad, Raynes, Davda and Victor LLP

(57) ABSTRACT

Provided are a computer program product, system, and method for populating a secondary cache with unmodified tracks in a primary cache when redirecting host access from a primary server to a secondary server. Host access to tracks is redirected from the primary server to the secondary server. Prior to the redirecting, updates to tracks in the primary storage were replicated to the secondary server. After the redirecting host access to the secondary server, host access is directed to the secondary server and the secondary storage. A secondary cache at the secondary server is populated with unmodified tracks in a primary cache at the primary server when the host access was redirected to the secondary server to make available to the host access redirected to the secondary server.

18 Claims, 6 Drawing Sheets

(51) Int. Cl.
  *G06F 11/20* (2006.01)
  *G06F 11/16* (2006.01)
  *G06F 11/00* (2006.01)

(52) U.S. Cl.
  CPC .......... *G06F 3/0617* (2013.01); *G06F 3/0635* (2013.01); *G06F 3/0656* (2013.01); *G06F 3/0689* (2013.01); *G06F 11/00* (2013.01); *G06F 11/1658* (2013.01); *G06F 11/203* (2013.01); *G06F 11/2038* (2013.01); *G06F 11/2048* (2013.01); *G06F 2212/152* (2013.01)

(56) References Cited

U.S. PATENT DOCUMENTS

| | | | |
|---|---|---|---|
| 8,812,899 | B1 | 8/2014 | Fultz et al. |
| 8,935,479 | B2 | 1/2015 | Benhase et al. |
| 9,430,386 | B2 | 8/2016 | Bruce et al. |
| 9,454,317 | B2 | 9/2016 | Ishizaki |
| 10,127,152 | B2 * | 11/2018 | Ash ........................ G06F 12/123 |
| 10,320,936 | B2 * | 6/2019 | Ash ..................... H04L 67/2852 |
| 2009/0222624 | A1 | 9/2009 | Giacomini et al. |
| 2011/0131373 | A1 | 6/2011 | Kumar et al. |
| 2011/0197096 | A1 | 8/2011 | Nakamura et al. |
| 2013/0132674 | A1 | 5/2013 | Sundrani |
| 2013/0185497 | A1 | 7/2013 | Benhase et al. |
| 2013/0185501 | A1 | 7/2013 | Ash et al. |
| 2014/0143452 | A1 | 5/2014 | Kivity |
| 2014/0258608 | A1 | 9/2014 | Viswanatha |
| 2015/0074222 | A1 | 3/2015 | Liang et al. |
| 2016/0203080 | A1 | 7/2016 | Bert et al. |
| 2017/0109284 | A1 | 4/2017 | Ash et al. |
| 2017/0111468 | A1 | 4/2017 | Ash et al. |
| 2019/0004951 | A1 | 1/2019 | Ash et al. |
| 2019/0222669 | A1 | 7/2019 | Ash et al. |

OTHER PUBLICATIONS

"HyperSwap Helps Keeps Storage from Becoming a Single Point of Failure", AIX, eNewsletter, Aug. 2013, [online] [retrieved Oct. 9, 2015] http://www.ibmsystemsmag.com/aix/administrator/highavailability/hyper . . . .

W. Bauer, et al., "IBM DS8000 and z/OS Basic HyperSwap", IBM Corp., RedPaper, 2008, pp. 38.

US Patent Application dated Oct. 20, 2015, pp. 33, for U.S. Appl. No. 14/918,408, filed Oct. 20, 2015.

Office Action dated Dec. 16, 2016, pp. 20, for U.S. Appl. No. 14/918,408, filed Oct. 20, 2015.

Response dated Mar. 16, 2017, pp. 14, to Office Action dated Dec. 16, 2016, pp. 20, for U.S. Appl. No. 14/918,408, filed Oct. 20, 2015.

Final Office Action dated Jun. 22, 2017, pp. 12, for U.S. Appl. No. 14/918,408, filed Oct. 20, 2015.

Response dated Sep. 11, 2017, pp. 14, to Office Action dated Dec. 16, 2016, pp. 20, for U.S. Appl. No. 14/918,408, filed Oct. 20, 2015.

Office Action dated Nov. 16, 2017, pp. 13, for U.S. Appl. No. 14/918,408, filed Oct. 20, 2015.

Response dated Feb. 16, 2018, pp. 14, to Officse Action dated Nov. 16, 2017, pp. 13, for U.S. Appl. No. 14/918,408, filed Oct. 20, 2015.

Notice of Allowance dated Jun. 14, 2018, pp. 13, for U.S. Appl. No. 14/918,408, filed Oct. 20, 2015.

US Patent Application dated Sep. 7, 2018, pp. 33, for U.S. Appl. No. 16/125,641, filed Sep. 7, 2018.

Office Action dated Oct. 19, 2018, pp. 13, for U.S. Appl. No. 16/125,641, filed Sep. 7, 2018.

Response to Office Action, dated Jan. 22, 2019, pp. 9, for U.S. Appl. No. 16/125,641, filed Sep. 7, 2018.

US Patent Application, dated Oct. 20, 2015, pp. 30, for U.S. Appl. No. 14/918,424, filed Oct. 20, 2015.

Office Action dated Dec. 15, 2017, pp. 32, for U.S. Appl. No. 14/918,424, filed Oct. 20, 2015.

Response dated Mar. 15, 2018, pp. 14, to Office Action dated Dec. 15, 2017, pp. 32, for U.S. Appl. No. 14/918,424, filed Oct. 20, 2015.

Final Office Action dated Apr. 18, 2018, pp. 21, for U.S. Appl. No. 14/918,424, filed Oct. 20, 2015.

Response dated Mar. 15, 2018, pp. 14, to Final Office Action dated Apr. 18, 2018, pp. 21, for U.S. Appl. No. 14/918,424, filed Oct. 20, 2015.

Office Action dated Aug. 8, 2018, pp. 26, for U.S. Appl. No. 14/918,424.

Response dated Nov. 8, 2018, pp. 16, to Office Action dated Aug. 8, 2018, pp. 26, for U.S. Appl. No. 14/918,424.

Notice of Allowance dated Jan. 25, 2019, pp. 8, for U.S. Appl. No. 14/918,424.

List of Patents or Patent Applications Treated As Related, dated Mar. 25, 2019, pp. 2.

Notice of Allowance dated May 30, 2019, pp. 10, for U.S. Appl. No. 16/125,641.

US Patent Application, dated Jul. 24, 2019,pp. 31 for U.S. Appl. No. 16/521,587, filed Jul. 24, 2019.

Preliminary Amendment dated Jul. 24, 2019, pp. 8, for U.S. Appl. No. 16/521,587, filed Jul. 24, 2019.

List of Patents or Patent Applications Treated As Related, dated Aug. 30, 2019, Total 2 pages.

Office Action dated Jul. 24, 2020, pp. 32 for Preliminary Amendment dated Jul. 24, 2019, pp. 8, for U.S. Appl. No. 16/521,587.

* cited by examiner

US 10,841,395 B2

POPULATING A SECONDARY CACHE WITH UNMODIFIED TRACKS IN A PRIMARY CACHE WHEN REDIRECTING HOST ACCESS FROM A PRIMARY SERVER TO A SECONDARY SERVER

BACKGROUND OF THE INVENTION

1. Field of the Invention

The present invention relates to a computer program product, system, and method for populating a secondary cache with unmodified tracks in a primary cache when redirecting host access from a primary server to a secondary server.

2. Description of the Related Art

In a storage environment, primary and secondary storage servers may maintain mirror copy relationships, where a primary volume in a mirror copy relationship comprises the storage or volumes from which data is physically copied to a secondary volume. Failover programs, such as International Business Machine Corporation's ("IBM") Hyper-Swap® which is a function in the z/OS® operating system, provides continuous availability for disk failures by maintaining the mirror copy relationships to provide synchronous copies of all primary disk volumes on one or more primary storage systems to one or more target (or secondary) storage systems. (HyperSwap is a registered trademark of IBM in countries throughout the world). When a disk failure is detected, code in the operating system identifies HyperSwap managed volumes and instead of failing the I/O request, HyperSwap switches (or swaps) information in internal control blocks so that the I/O request is driven against the secondary volume of the mirror copy relationship. Since the secondary volume is an identical copy of the primary volume prior to the failure, the I/O request will succeed with no impact to the program issuing the I/O request, which could be an application program or part of the operating system. This therefore masks the disk failure from the program and avoids an application and/or system outage. (IBM, HyperSwap, and z/OS are registered trademarks of IBM in many countries).

There is a need in the art for improved techniques for redirecting host access from a primary server to a secondary server.

SUMMARY

Provided are a computer program product, system, and method for populating a secondary cache with unmodified tracks in a primary cache when redirecting host access from a primary server to a secondary server. Host access to tracks is redirected from the primary server to the secondary server. Prior to the redirecting, updates to tracks in the primary storage were replicated to the secondary server. After the redirecting host access to the secondary server, host access is directed to the secondary server and the secondary storage. A secondary cache at the secondary server is populated with unmodified tracks in a primary cache at the primary server when the host access was redirected to the secondary server to make available to the host access redirected to the secondary server.

DETAILED DESCRIPTION

In prior art failover technologies, when the failover occurs from the primary server to the secondary server, the secondary server cache does not include the unmodified tracks that were in the primary server cache at the time of failover because the mirroring operations that were being performed between the primary server and the secondary server prior to the failover did not mirror unmodified tracks. Thus, the secondary cache does not include the complete content of the primary cache being taken offline, so the cache hit ratio and cache performance at the secondary server does not match the performance experienced at the primary server because the unmodified tracks are not cached at the secondary server after the failover. Described embodiments address this problem by providing techniques to populate the secondary cache with the content of the primary cache being taken offline so that the cache hit ratio and cache performance at the secondary server approximates the performance experienced at the primary server before the failover.

Figure 1:
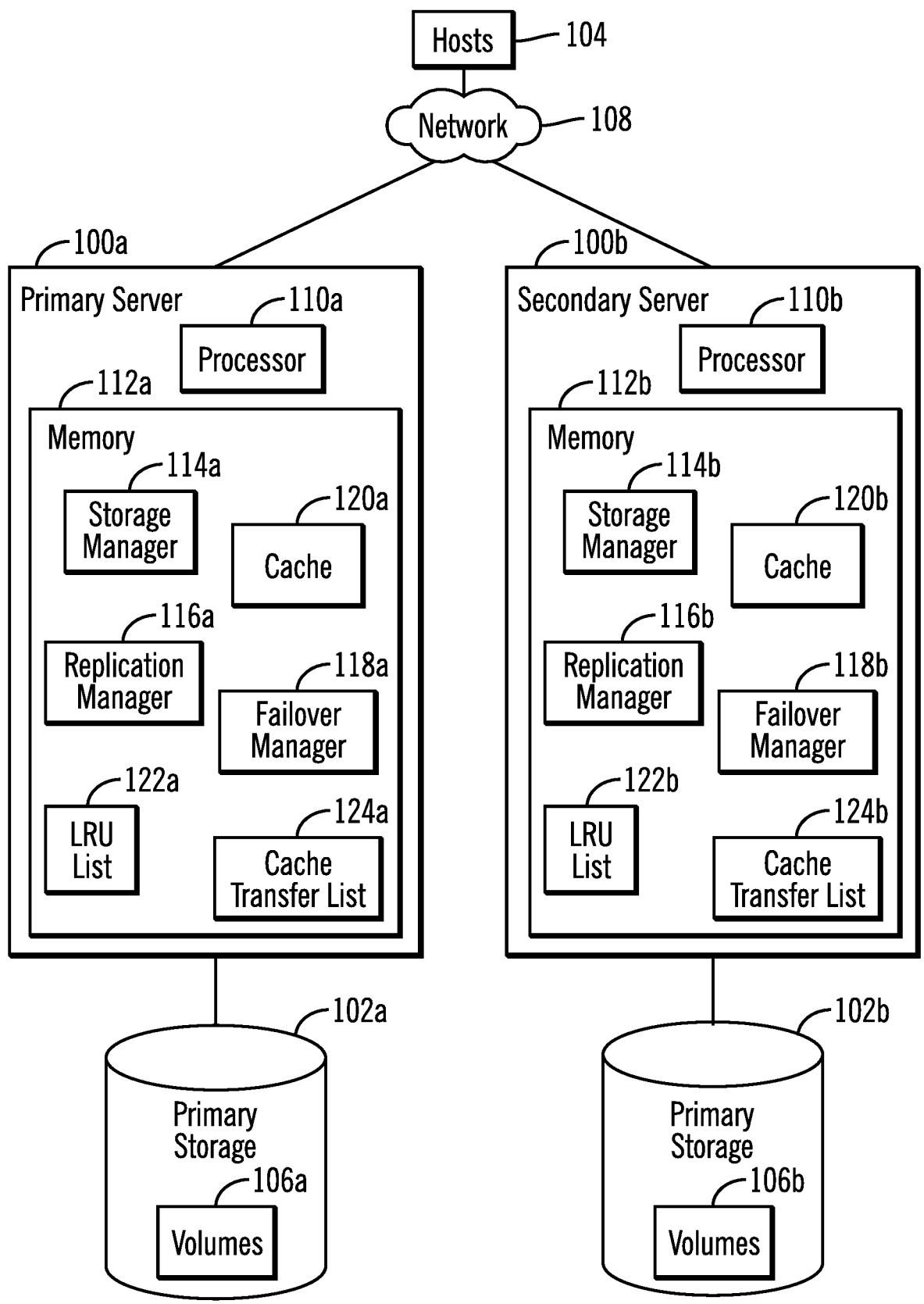
FIG. 1 illustrates an embodiment of a storage environment.

FIG. 1 illustrates a storage environment having a primary server 100a and a secondary server 100b that manage a primary storage 102a and a secondary storage 102b, respectively. Hosts 104 may access volumes 106a and 106b in the primary storage 102a and the secondary storage 102b, respectively, over a network 108. The primary server 100a and the secondary server 100b may also communicate over the network 108 or a separate network or interface. The volumes 106a, 106 may comprise a Logical Unit Number (LUN), Logical Subsystem (LSS), or any grouping of tracks, where a track may comprise a block, track or any data unit.

Each server 100a, 100b includes a processor 110a, 110b, comprising one or more processor devices, and a memory 112a, 112b. Each memory 112a, 112b includes a storage manager 114a, 114b to manage read and write access to the respective storage 102a, 102b from the hosts 104, a replication manager 116a, 116b to replicate data between the servers 100a, 100b, and a failover manager 118a, 118b to allow for the failover from one server to the other.

For replication, initially, the hosts 104 may direct Input/Output (I/O) requests to the primary server 100a to access tracks from the primary storage 102a. In such case, the primary replication manager 116a would initially copy all volumes 106a being replicated to the secondary storage 102b and then upon receiving an update to a volume 106a, transfer that updated track to the secondary server 100b to store in the secondary storage 102b. In the event the primary server 100a is taken offline, due to a planned or unplanned event, a failover operation may be performed by the failover managers 118a, 118b to failover from the primary server 100a to the secondary server 100b so that all host 104 I/O access is redirected to the secondary server 100b and secondary storage 102b. The failover managers 118a, 118b may also manage a failback operation, so that once the primary server 100a is back online, the failover managers 118a, 118b may manage a failback from the secondary server 100b to the primary server 100a so that all host 104 I/O access is redirected back to the primary server 100a and primary storage 102a. In certain embodiments, the failover manager 118a, 118b may comprise International Business Machine Corporation's ("IBM") HyperSwap® program or other similar failover programs by other vendors.

A failover operation from one server to another comprises any operation which redirects host 104 access from one server and storage pair to the other server and storage pair to provide hosts 104 continual access to data, whether it be accessed from the primary storage 102a or the secondary storage 102b. In this way, the failover operation allows for continued, minimally interrupted access to storage.

The memories 112a, 112b further include a cache 120a, 120b to cache read and write data with respect to the volumes 106a, 106b in the respective primary 102a and secondary 102b storages. The storage managers 114a, 114b each maintain a Least Recently Used (LRU) list 122a, 122b providing an ordered index to the tracks in the cache 120a, 120b subject to read and write access. A track subject to a read or write operation is added to a Most Recently Used (MRU) end of the LRU list 122a, 122b. The storage managers 114a, 114b may build cache transfer lists 124a, 124b indicating unmodified tracks in the cache 120a, 120b for transferring the content of one cache 120a, 120b to the other cache 120b, 120a, respectively.

The network 108 may comprise a Storage Area Network (SAN), Wide Area Network (WAN), Local Area Network (LAN), the Internet, and Intranet, a wireless network, wired network, etc. Additionally, the servers 100a, 100b may communicate over another interface, such as a bus or other network, including a Peripheral Component Interconnect Express (PCIe) bus.

The storages 102a, 102b may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes 106a, 106b may further be configured from an array of devices, such as Just a Bunch of Disks (JBOD), Direct Access Storage Device (DASD), Redundant Array of Independent Disks (RAID) array, virtualization device, etc. Further, the storages 102a, 102b may comprise heterogeneous storage devices from different vendors and different types of storage devices, such as a first type of storage devices, e.g., hard disk drives, that have a slower data transfer rate than a second type of storage devices, e.g., SSDs.

In certain embodiments, one or more volumes 106a, 106b may be implemented in different types of storage devices. For instance, some of the tracks of one or more volumes 106a, 106b may be configured in hard disk drives, while other of the tracks of one or more volumes 106a, 106b may be configured in SSDs. Thus, a first type of storage device in which volumes 106a, 106b are configured may have a slower data access and transfer rate than a second type of storage device in which volumes are configured.

Figure 2:
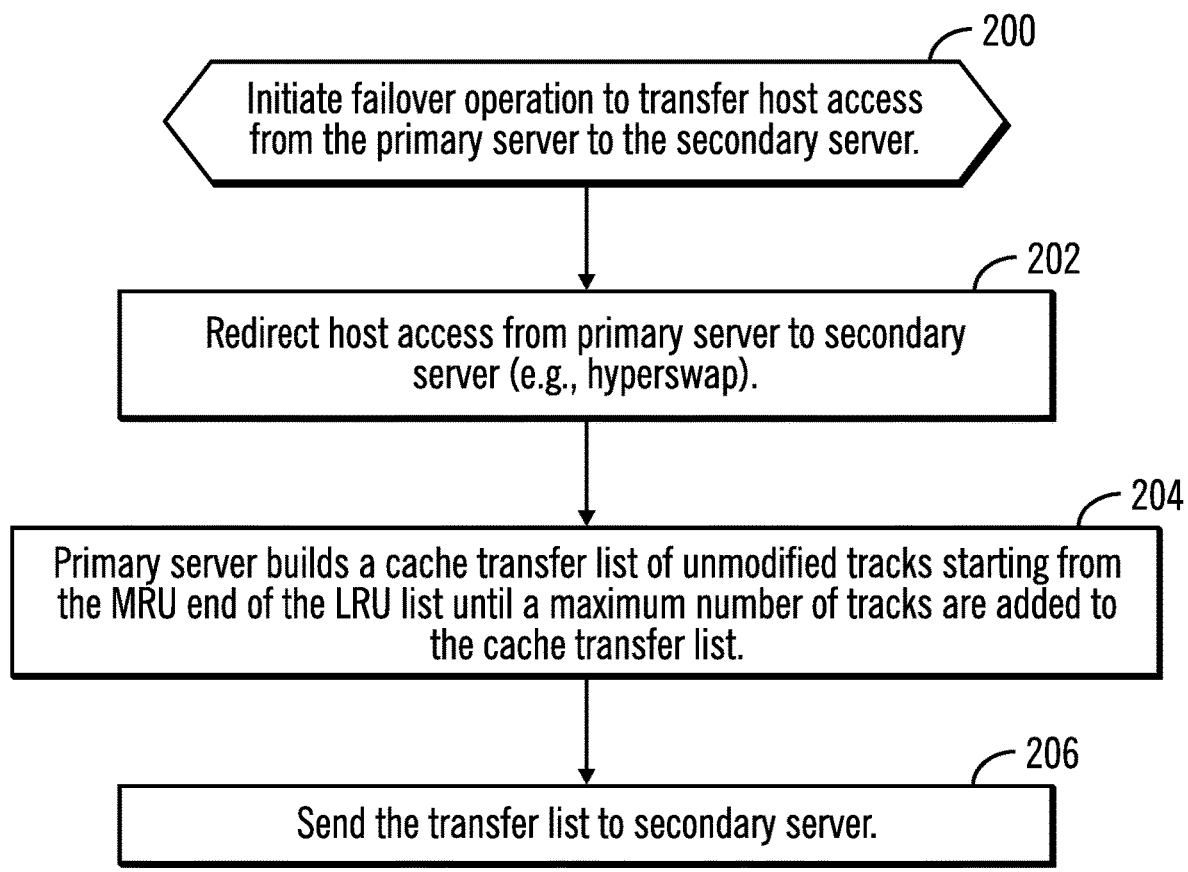
FIG. 2 illustrates an embodiment of operations to transfer failover from a primary server to a secondary server.
Figure 3:
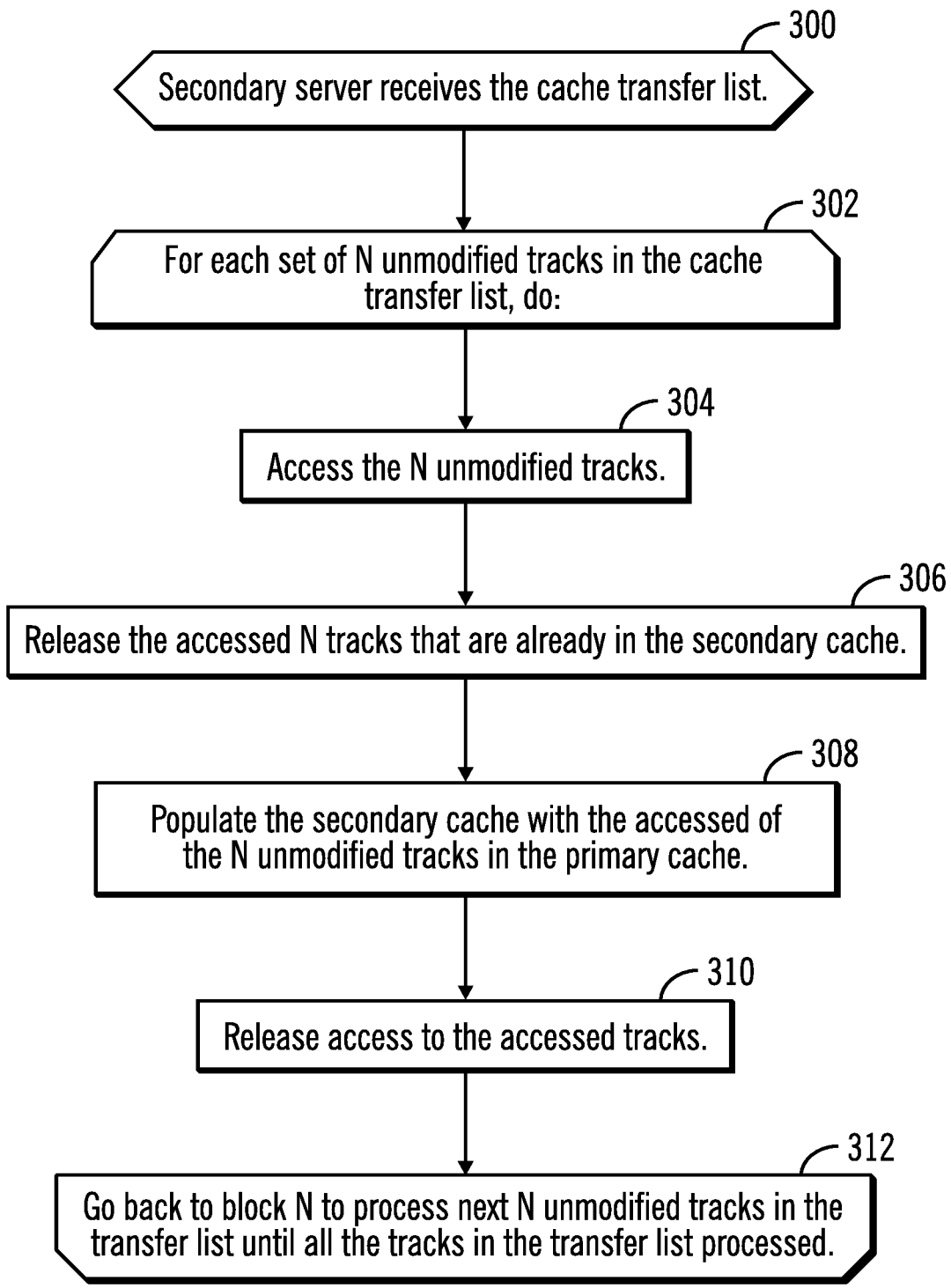
FIGS. 3, 4a, and 4b illustrate embodiments of operations to populate a secondary cache in the secondary server with unmodified tracks in a primary cache in the primary server when performing a failover from the primary server to the secondary server.

FIGS. 2 and 3 illustrate an embodiment of operations performed at the failover managers 118a, 118b to failover from the primary server 100a to the secondary server 100b in a manner that maintains the cache hit ratio experienced at the primary server 100a before the failover. The failover may be planned, such as to service or upgrade the primary server 100a or may be unplanned. Although FIGS. 2 and 3 are described as a failover from the primary server 100a to the secondary server 100b, the operations may apply to a failback from the secondary server 100b to the primary server 100a.

With respect to FIG. 2, upon initiating (at block 200) the failover operation from the primary server 100a (or secondary server 100b) to the secondary server 100b (or primary server 100a), the failover manager 118a redirects (at block 202) host 104 I/O access from the primary server 100a to the secondary server 100b, such as by performing a HyperSwap or other failover operation.

After the failover has completed and host I/O access is being routed to the secondary server 100b to perform I/O operations with respect to the secondary storage 102b, the failover manager 118a, or some other component, may build (at block 204) a primary cache transfer list, e.g., 124a, of unmodified tracks in the source cache 120a starting from the MRU end of the LRU list 122a until a maximum number of tracks are added to the primary cache transfer list 124a. The primary cache transfer list 124a is then sent (at block 206) to the secondary server 100b. The primary server 100a does not need to transfer modified tracks to the secondary server 100b, because such modified tracks would have been transferred as part of the replication operations by the replication manager 116a while both the primary server 100a and secondary 100b server were operational and mirroring data.

FIG. 3 illustrates an embodiment of operations performed by the failover manager 118b or some other component at the secondary server 100b, such as the storage manager 114b or replication manager 116b, or a combination of programs, to manage the failover to the secondary server 100b. Upon the secondary server 100b receiving (at block 300) the primary cache transfer list 124a from the primary server 100a, the secondary failover manager 118b performs a loop of operations 302-312 for each sequence of N unmodified tracks in the primary cache transfer list 124a to process. The N unmodified tracks being considered are accessed (at block 304) to prevent access at the secondary storage 102b by another process or host 104 redirected to the secondary server 100b. Access is released (at block 306) for any of the accessed unmodified tracks that are already in the secondary cache 120b, as unmodified or modified tracks. The secondary failover manager 118b or other component populates the secondary cache 120b with the accessed N tracks in the primary cache 120a. The secondary cache 120b may be populated with the accessed of the N tracks by transferring the unmodified tracks to the secondary cache 120b directly from the primary cache 120a, such as through a Direct Memory Access (DMA) type operation, or by reading the unmodified tracks from the secondary storage 102b. In certain embodiments where the tracks are transferred over the network 108, a Remote Direct Memory Access (RDMA) transfer technology may be used to allow for direct cache-to-cache transfer. Other transfer technologies may be used to copy tracks directly from the primary cache 120a to the secondary cache 120b over the network 108 or some other interface. After the secondary cache 120b is populated with the unmodified tracks, access to the tracks is released (at block 310). Control proceeds (at block 312) back to block 302 to consider a next N (or remaining) unmodified tracks in the primary transfer list 124a until all the unmodified tracks in the source cache transfer list 124a are processed.

With the operations of FIGS. 2 and 3, the secondary cache 120b is populated with the unmodified tracks in the primary cache 120a being taken offline to maintain the cache hit ratio at the secondary server 100b experienced at the primary server 100a before the failover. The secondary server 100b does not have to rebuild the secondary cache 102b, because the secondary cache 102b is populated with the unmodified tracks in the primary cache 120a to maintain the cache hit ratio at the secondary server 102b to which host 104 I/O access is redirected. Further, the secondary cache 120b would already have modified tracks in its secondary cache 120b that were in the primary cache 120a at the time of the failover because such modified tracks would have been copied over as part of the replication and mirroring operations performed while host I/O access was directed to the primary server 100a.

Figure 4A:
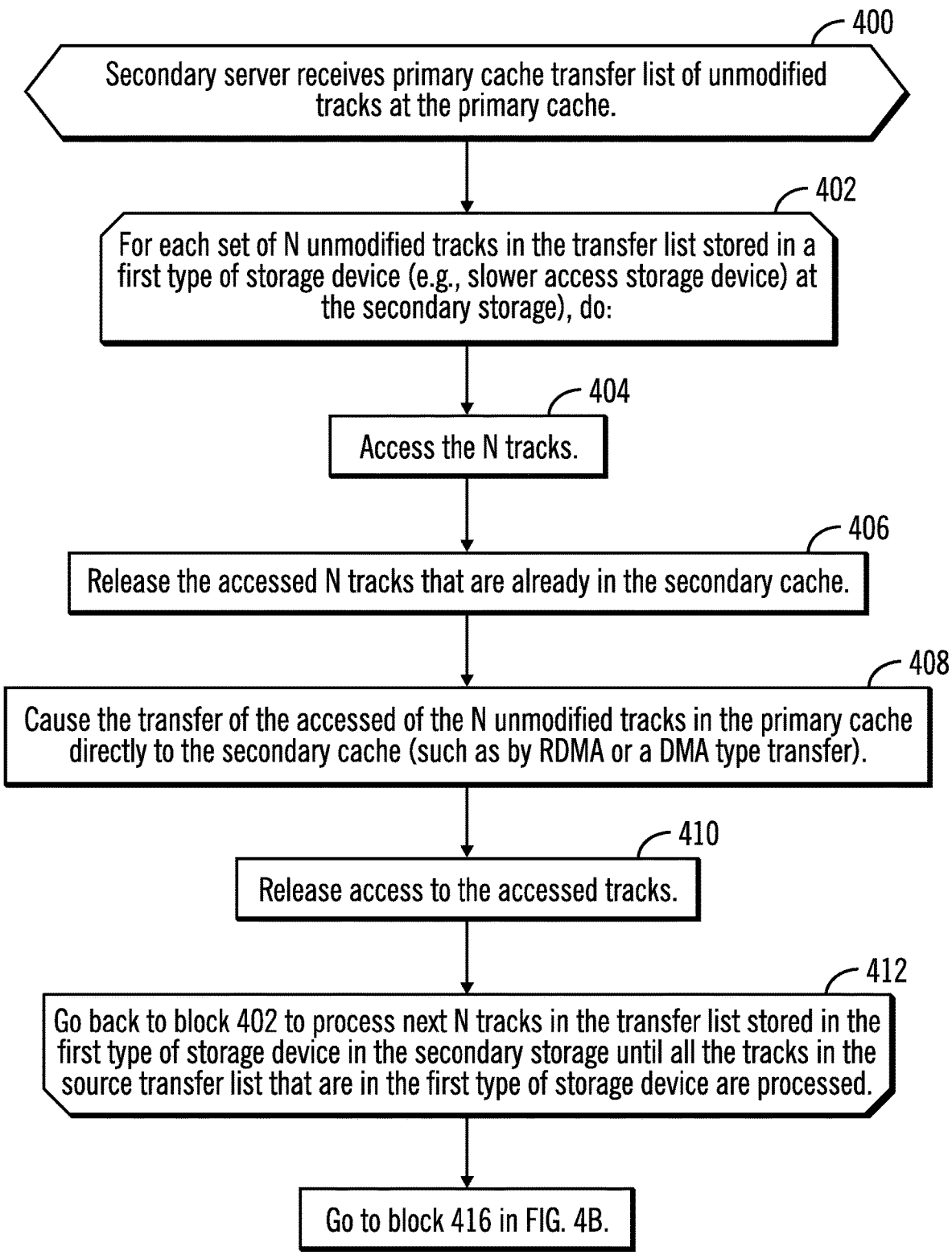
Figure 4B:
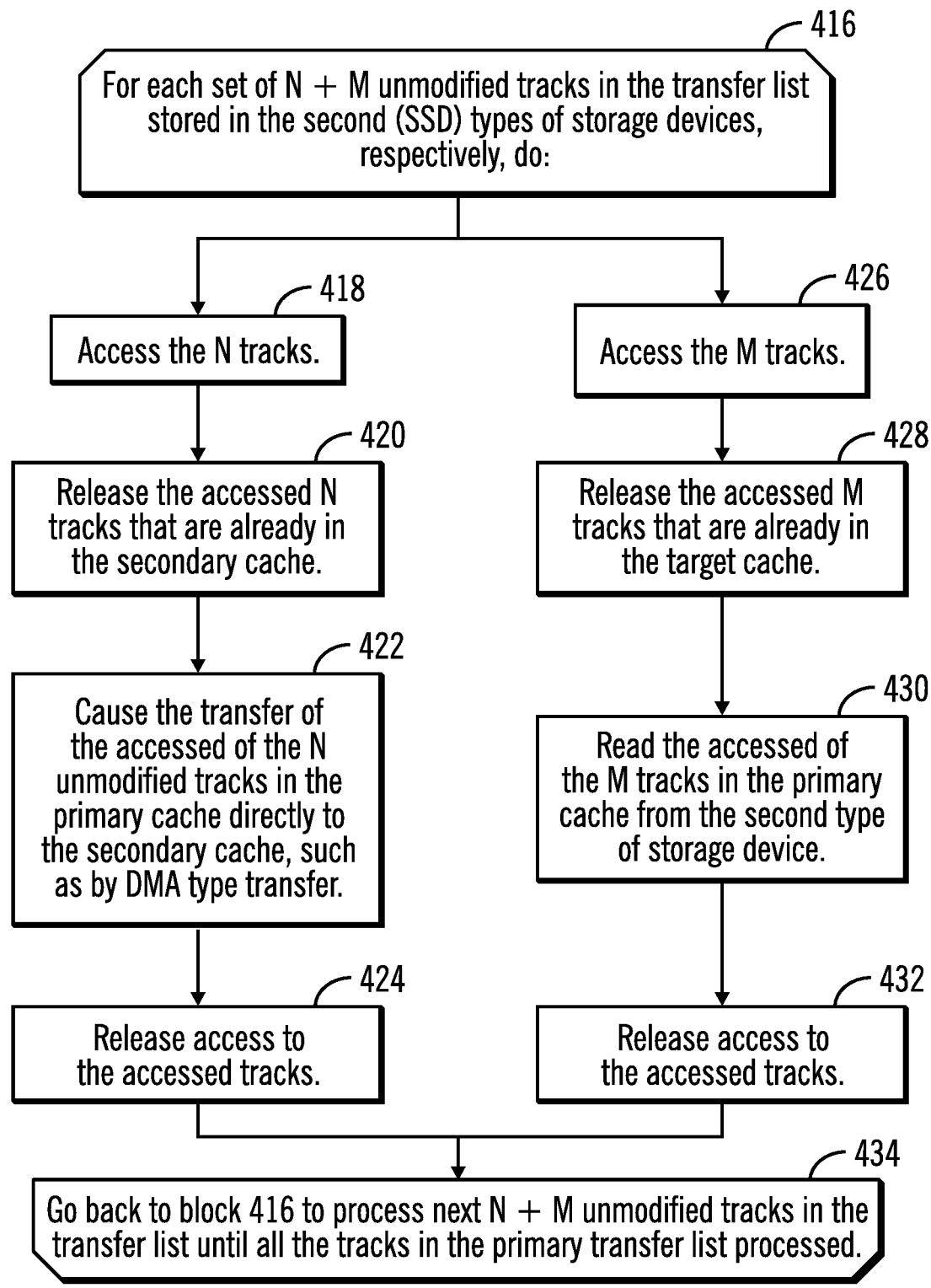

FIGS. 4a and 4b illustrate an alternative embodiment of operations performed by the secondary failover manager 118b (or some other component) to populate the secondary cache 120b with the unmodified tracks in the primary cache 120a at the time of failover taking into account the transfer rate speed of the type of storage device at the secondary storage 102b in which the tracks are stored. Upon the secondary server 100b receiving (at block 400) the primary cache transfer list 124a of unmodified tracks in the primary cache 120a, the secondary failover manager 118b performs a loop of operations at blocks 402 through 412 for each sequence of N unmodified tracks in the primary cache transfer list 124a that are stored in a first type of storage device in the secondary storage 102b. The first type of storage device (e.g., a hard disk drive) may have a slower access profile than a second type of storage (e.g., a SSD), where the secondary storage 102b may by comprised of both the first and second types of storage devices or of just one of the types of devices. The N tracks in the first type of storage device in the secondary storage 102b being considered are accessed (at block 404) to prevent access by another process. Access is released (at block 406) for any of the accessed tracks that are already in the second cache 116b. The secondary failover manager 118b or other component causes the transfer (at block 408) of the accessed N tracks in the primary cache 116a directly to the secondary cache 116b over the network 108. The transfer may involve a type of DMA operation, such as an RDMA or other direct cache transfer. After the tracks are transferred, access to the tracks is released (at block 410). Control proceeds (at block 412) back to block 402 to consider a next N (or remaining) tracks in the primary cache transfer list 124a stored in the first type of storage device in the secondary storage 102b until all the tracks stored in the first type of storage device in the secondary storage 102b are processed.

After processing all the tracks in the primary cache transfer list 124a that are stored in the first type of storage device in the secondary storage 102b, control proceeds to block 416 in FIG. 4b where the secondary failover manager 118b performs a loop of operations at blocks 416 through 434 for each sequence of N+M unmodified tracks in the source cache transfer list 124a that are in the second type of storage device in the secondary storage 102b, which comprises the faster access storage device than the first type of storage device. The secondary failover manager 118b performs two streams of parallel operations, a first stream at blocks 418 through 424 for the first N tracks and a second stream at blocks 426 through 432 for the second M tracks in the group of N+M tracks.

For the first stream, the secondary failover manager 118b accesses (at block 418) the N tracks to prevent access by another process. Access is released (at block 420) for any of the accessed N tracks that are already in the secondary cache 120b. The secondary failover manager 118b or other component causes (at block 422) the transfer of the accessed N unmodified tracks in the primary cache 116a directly to the secondary cache 116b from the primary cache 116a, such as by using a DMA type of operation from the primary cache 116a to the secondary cache 116b, such as RDMA. After the tracks are transferred, access to the tracks is released (at block 424).

For the second stream, the secondary failover manager 118b accesses (at block 426) the M tracks in the group of N+M tracks to prevent access by another process. Access is released (at block 428) for any of the accessed M tracks that are already in the secondary cache 116b. The secondary failover manager 118b or other component reads (at block 430) the accessed of the M unmodified tracks that are in the primary cache 116a from the second type of storage device in the secondary storage 102b, such as an SSD. After the tracks are transferred to the secondary cache 116b, access to the tracks is released (at block 432).

After performing both parallel streams of transferring the N and M tracks, control proceeds (at block 434) back to block 416 to consider a next N+M (or remaining) tracks in the source cache transfer list 124a until all the unmodified tracks indicated in the source cache transfer list 124a are processed.

In the operations of FIG. 4b, N and M may be set such that both separate streams of cache transfer operations, through direct cache transfer from the primary cache 116a or reading from secondary storage 102b would complete at approximately the same time. For instance, if the DMA type operations are faster than the reading from the fast access storage device in the secondary storage 102b, e.g., SSD, then N may be set to a greater number than M so that both the first and second streams of transfer operations complete at approximately the same time. The opposite is true, i.e., M is greater than N, if the storage device read operations have a faster transfer time than the cache DMA operation.

With the operations of FIG. 4b, if the tracks are stored in a faster access storage device, then the unmodified tracks in the primary cache 116a may be transferred from two different locations, a direct cache (e.g., DMA, RDMA) transfer from the primary cache 116a and from the faster access storage devices at the secondary storage 102b to reduce the time needed to populate the secondary cache 116b with the tracks from the primary cache 116a by transferring tracks in parallel from two different data sources. When the storage devices at the secondary storage 102b in which the tracks are stored are not sufficiently fast to approximate the speed of the DMA transfer, then as in FIG. 4a, all the tracks may be transferred directly from the primary cache 116a.

In implementations where the secondary storage 102b is only comprised of the first type of storage devices, then only the operations at blocks 402-412 (FIG. 4a) would be performed to populate the secondary cache 120b with the unmodified tracks in the primary cache 120a at the time of the failover. In implementation where the secondary storage 102b is only comprised of the second type of storage devices, then only the operations at blocks 416-434 in FIG. 4b would be performed to populate the secondary cache 120b with the unmodified tracks in the primary cache 120a at the time of the failover.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
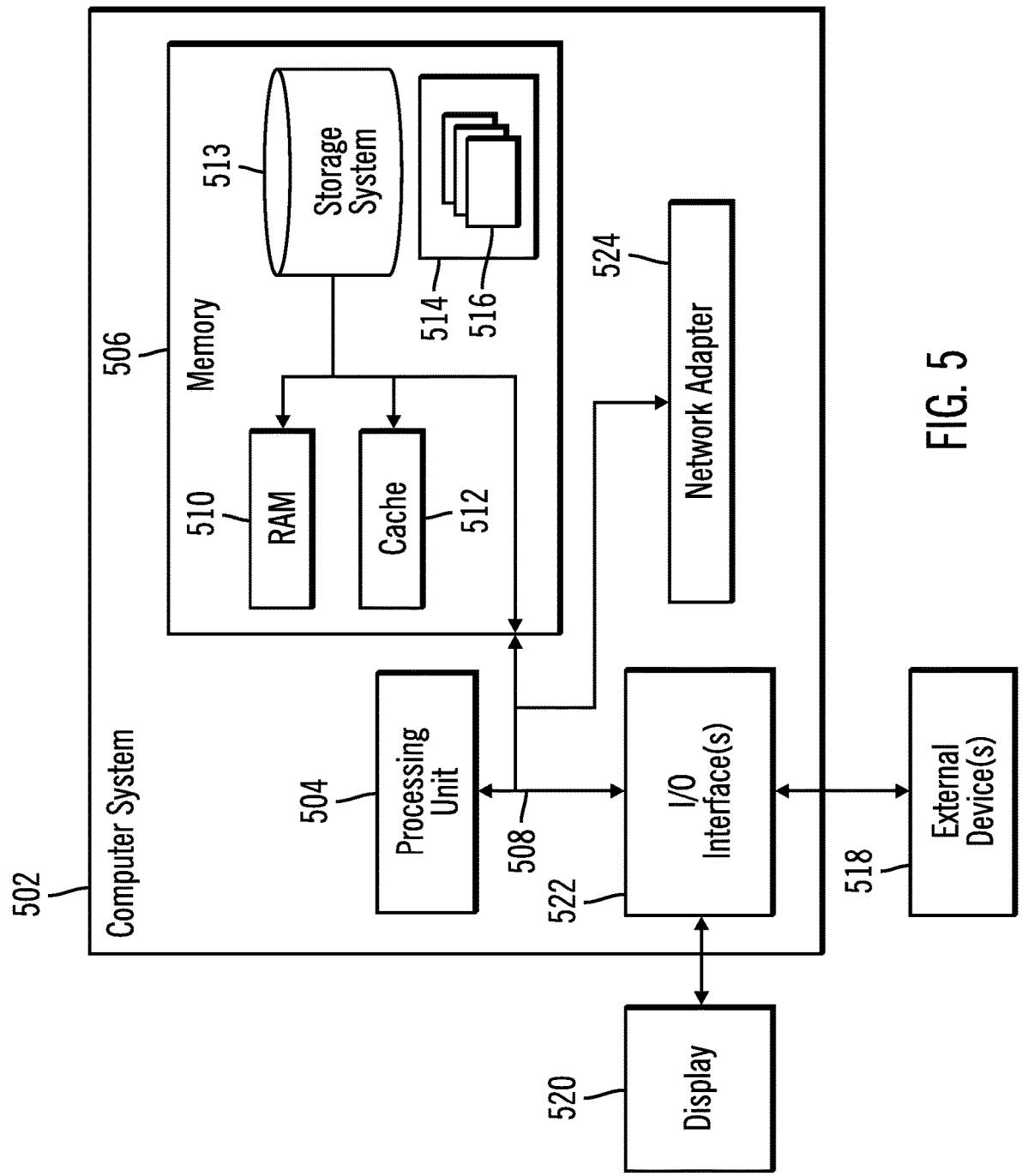
FIG. 5 illustrates an embodiment of a computer architecture used with described embodiments.

The computational components of FIG. 1, including the servers 100*a*, 100*b*, and hosts 104 may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 is shown in the form of a general-purpose computing device. The components of computer system/server 502 may include, but are not limited to, one or more processors or processing units 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 502 may be implemented as program modules 516 which generally carry out the functions and/or methodologies of embodiments of the invention as described herein. The systems of FIG. 1 may be implemented in one or more computer systems 502, where if they are implemented in multiple computer systems 502, then the computer systems may communicate over a network.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for redirecting host access from a primary server to a secondary server, wherein the primary server manages access to a primary storage and the secondary server manages access to a secondary storage, the computer program product comprising a computer readable storage medium having computer readable program code embodied therein that is executable to perform operations, the operations comprising:

replicating updates to tracks in the primary storage to the secondary storage; and in response to a failover operation, performing:

redirecting host access to tracks from the primary server to the secondary server, wherein after the redirecting host access to the secondary server, host access is directed to the secondary server and the secondary storage;

transferring a first group of unmodified tracks in a primary cache at the primary server to a secondary cache at the secondary server by direct transfer from the primary cache to the secondary cache; and reading a second group of unmodified tracks in the primary cache from the secondary storage to the secondary cache, wherein the first and the second groups of unmodified tracks are concurrently transferred to the secondary cache to make the first and the second groups of unmodified tracks in the primary cache available in the secondary cache to the host access redirected to the secondary server as part of the failover operation.

2. The computer program product of claim 1, wherein the operations further comprise:

preventing host access to the tracks at the secondary storage that are indicated as unmodified tracks in the primary cache at the primary server; and allowing host access to the accessed tracks in the secondary storage, indicated as unmodified tracks in the primary cache, in response to populating the secondary cache with the unmodified tracks in the primary cache.

3. The computer program product of claim 1, wherein the unmodified tracks transferred to the secondary cache comprise unmodified tracks in the primary cache not already in the secondary cache to the secondary cache.

4. The computer program product of claim 1, wherein the operations further comprise:

for unmodified tracks in the primary cache that are stored in a first type of storage device in the secondary storage, transferring the unmodified tracks directly from the primary cache to the secondary cache, wherein the transferring the first group of the unmodified tracks and the reading the second group of the unmodified tracks are performed; for tracks in the primary cache that are stored in a second type of storage device.

5. A system, comprising:

a primary server including a primary cache and managing host access to a primary storage, wherein the primary cache caches read and write data with respect to the primary storage;

a secondary server including a secondary cache and managing host access to a secondary storage, wherein the secondary cache caches read and write data with respect to the secondary storage;

wherein the primary server and the secondary server perform operations, the operations comprising:

replicating updates to tracks in the primary storage to the secondary storage; and in response to a failover operation, performing:

redirecting host access to tracks from the primary server to the secondary server, wherein after the redirecting host access to the secondary server, host access is directed to the secondary server and the secondary storage; and transferring a first group of unmodified tracks in a primary cache at the primary server to a secondary cache at the secondary server by direct transfer from the primary cache; and reading a second group of unmodified tracks in the primary cache from the secondary storage to the secondary cache, wherein the first and the second groups of unmodified tracks are concurrently transferred to the secondary cache to make the first and the second groups of unmodified tracks in the primary cache available in the secondary cache to the host access redirected to the secondary server as part of the failover operation.

6. The system of claim 5, wherein the operations further comprise:

preventing host access to the tracks at the secondary storage that are indicated as unmodified tracks in the primary cache at the primary server; and allowing host access to the accessed tracks in the secondary storage, indicated as unmodified tracks in the primary cache, in response to populating the secondary cache with the unmodified tracks in the primary cache.

7. The system of claim 6, wherein the operations further comprise:

receiving, at the secondary server, information on the unmodified tracks in the primary cache, wherein the preventing the host access is performed by the secondary server in response to receiving the information on the unmodified tracks.

8. The system of claim 5, wherein the unmodified tracks transferred to the secondary cache comprise unmodified tracks in the primary cache not already in the secondary cache to the secondary cache.

9. The system of claim 5, wherein the operations further comprise:

for unmodified tracks in the primary cache that are stored in a first type of storage device in the secondary storage, transferring the unmodified tracks directly from the primary cache to the secondary cache, and wherein the transferring the first group and the second group of the unmodified tracks are performed for tracks in the primary cache that are stored in a second type of storage device in the secondary storage.

10. A method for redirecting host access from a primary server to a secondary server, wherein the primary server manages access to a primary storage and the secondary server manages access to a secondary storage:

replicating updates to tracks in the primary storage to the secondary storage; and in response to a failover operation, performing:

redirecting host access to tracks from the primary server to the secondary server, wherein after the redirecting host access to the secondary server, host access is directed to the secondary server and the secondary storage;

transferring a first group of unmodified tracks in a primary cache at the primary server to a secondary cache at the secondary server by direct transfer from the primary cache to the secondary cache; and reading a second group of unmodified tracks in the primary cache from the secondary storage to the secondary cache, wherein the first and the second groups of unmodified tracks are concurrently transferred to the secondary cache to make the first and the second groups of unmodified tracks in the primary cache available in the secondary cache to the host access redirected to the secondary server as part of the failover operation.

11. The method of claim 10, further comprising:

preventing host access to the tracks at the secondary storage that are indicated as unmodified tracks in the primary cache at the primary server; and allowing host access to the accessed tracks in the secondary storage, indicated as unmodified tracks in the primary cache, in response to populating the secondary cache with the unmodified tracks in the primary cache.

12. The method of claim 11, further comprising:

receiving, at the secondary server, information on the unmodified tracks in the primary cache, wherein the preventing the host access is performed by the secondary server in response to receiving the information on the unmodified tracks.

13. The method of claim 10, wherein the unmodified tracks transferred to the secondary cache comprise transferring unmodified tracks in the primary cache not already in the secondary cache to the secondary cache.

14. The computer program product of claim 2, wherein the operations further comprise:

receiving, at the secondary server, information on the unmodified tracks in the primary cache, wherein the preventing the host access is performed by the secondary server in response to receiving the information on the unmodified tracks.

15. The computer program product of claim 1, wherein the unmodified tracks populated into the secondary cache comprise up to a maximum number of unmodified tracks from a most recently used (MRU) end of a least recently used (LRU) list of tracks in the primary cache.

16. The system of claim 5, wherein the unmodified tracks populated into the secondary cache comprise up to a maximum number of unmodified tracks from a most recently used (MRU) end of a least recently used (LRU) list of tracks in the primary cache.

17. The method of claim 10, wherein the unmodified tracks populated into the secondary cache comprise up to a maximum number of unmodified tracks from a most recently used (MRU) end of a least recently used (LRU) list of tracks in the primary cache.

18. The method of claim 10, further comprising:

for unmodified tracks in the primary cache that are stored in a first type of storage device in the secondary storage, transferring the unmodified tracks directly from the primary cache to the secondary cache, and wherein the transferring the first group and the second group of the unmodified tracks are performed for tracks in the primary cache that are stored in a second type of storage device in the secondary storage.

* * * * *